United States Patent [19]

Ma

[11] Patent Number: 5,587,034
[45] Date of Patent: Dec. 24, 1996

[54] PROCESS FOR PULTRUDING FIBER REINFORCED FURAN COMPOSITES

[75] Inventor: Chen-Chi M. Ma, Hsinchu, Taiwan

[73] Assignee: National Science Council, Taipei, Taiwan

[21] Appl. No.: 965,864

[22] Filed: Oct. 23, 1992

[51] Int. Cl.$^6$ .................................................. B29C 70/52
[52] U.S. Cl. .......................... 156/166; 156/180; 264/137
[58] Field of Search ............................... 156/166, 180, 156/441; 264/137, 174, 136, 171.13, 171.23

[56] References Cited

U.S. PATENT DOCUMENTS

| | | | |
|---|---|---|---|
| 30,770 | 10/1881 | Shobert et al. | 156/180 |
| 2,741,294 | 4/1956 | Pancherz | 156/441 |
| 3,244,784 | 4/1966 | Boggs | 156/441 |
| 3,367,814 | 2/1968 | Weiner et al. | 156/166 |
| 4,394,338 | 7/1983 | Fuwa | 264/174 |
| 4,474,636 | 10/1984 | Bogner | 156/307.3 |
| 4,873,128 | 10/1989 | Ma et al. | 156/180 |

OTHER PUBLICATIONS

Bozer et al., 26th Annual Technical Conference, 1971.
Bozer et al., 27th Annual Technical Conference, 1972.
Selley, 29th Annual Technical Conference, 1974.
Bozer et al., 30th Anniversary Technical Conference, 1975.
Szymanski et al., *Chemical Engineering Progress*, 70(1), 51–54, Jan. 1974.
Downing, *The Chemical Engineer*, 272–274, Apr. 1978.

*Primary Examiner*—Steven D. Maki
*Attorney, Agent, or Firm*—Bacon & Thomas

[57] ABSTRACT

The present invention relates to a pultrusion process for preparing fiber reinforced furan resin composites by drawing a plurality of continuous filaments through an impregnating bath of liquid furan to wet-out the filaments with the resin and a squeeze orifice for removal of excess resin and air, and continuously pulling the resin-impregnated filament through a pultrusion die to heat and cure the resin. The liquid furan resin contains a furfuryl alcohol prepolymer and a minor portion of an acid catalyst, and is maintained at a temperature of 15°–35° C. and has a viscosity of 500–3000 cps during the impregnating step. A postcuring treatment may be optionally employed to the pultruded fiber reinforced furan resin composites for improving their mechanical properties, which includes heating the pultruded composites at a temperature of 100°–220° C. for a period of 1–18 hours. Adding 1–15 wt % of mineral fillers may also improve the mechanical properties of the pultruded composites.

6 Claims, No Drawings

PROCESS FOR PULTRUDING FIBER REINFORCED FURAN COMPOSITES

TECHNICAL FIELD OF THE INVENTION

The present invention relates to a pultrusion process for producing fiber reinforced furan composites.

BACKGROUND OF THE INVENTION

In a paper given at the 26th Annual Technical Conference 1971, Reinforced Plastics/Composites Division, The Society of the Plastics Industry, Inc., entitled "Fiberglass Reinforced Furan Composites—An Unique Combination of Properties", 1971, K. B. Bozer, et al. disclosed fiberglass reinforced furan laminates made by modified furan resins and a series of new catalysts. These resin-catalyst systems offer improved processing characteristics. The laminates prepared with these systems were reported to have physical properties comparable to polyesters while exhibiting outstanding chemical resistance, good heat distortion and flame resistance, and low smoke emission.

K. B. Bozer and L. H. Brown, in an article entitled "High Temperature and Combustion Properties of Furan Composites" given at the 27th Annual Technical Conference 1972, Reinforced Plastics/Composites Institute, The Society of the Plastics Industry, Inc., reported the performance of furan resins and chemically resistant furan-fiberglass composites at elevated temperatures, in particular the flame resistance of these materials. The furan-fiberglass composites used in this article are laminates fabricated by conventional hand lay-up technique.

J. E. Selley, in his article entitled "Furfuryl Alcohol Resins with Low Flame-Spread Low Smoke" given at the 29th Annual Technical Conference 1972, Reinforced Plastics/Composites Institute, The Society of the Plastics Industry, Inc., disclosed new catalysts suitable to be used in furan resins, which allow improved processing and fire performance. In this article, fiber reinforced furan resin composites are fabricated by lamination.

K. B. Bozer and D. D. Watson, in their article entitled "Furfuryl Alcohol Resin Systems for Hand Lay-Up and Spray-Up Fabrication" given at the 30th Annual Technical Conference 1975, Reinforced Plastics/Composites Institute, The Society of the Plastics Industry, Inc., disclosed a new furfuryl alcohol-based resin and catalyst system with improved handling and laminate performance properties for hand lay-up or spray-up fabrication of fiberglass/furan resin composite.

W. A. Szymanski and D. W. Kloda, in their article entitled "Polyester and Furfuryl Alcohol Resins for Corrosion Control", *Chemical Engineering Progress*, Vol. 70 No. 1 pp. 51–54 (1974), described processes for preparing fiberglass reinforced plastics by using polyester and furfuryl alcohol resins, which include a spray winder technique, a molding process and a laminating process. The spray winder technique integrally combines filament winding with chopped glass strand and resin spray-up.

In an article entitled "Glass fibre Reinforced furan Resins", *The Chemical Engineer*, April 1978, P. A. Downing discussed the characteristics of glass fibre reinforced furan resin composite and illustrates the advantages thereof in corrosion control, in which the composites are fabricated by hand lay-up and filament winding techniques. The inventor of present invention, Chen-Chi Martin Ma, and his co-worker in U.S. Pat. No. 4,873,128, disclosed a process for pultruding fiber reinforced phenolic resin products, in which a liquid phenolic resin for impregnating filaments is heated to a temperature of 45°–65° C. during the impregnating step so that the phenolic resin has a suitable impregnating viscosity.

It can be seen from the above-mentioned articles that the fiber reinforced furan resin composites have relatively strong physical strength, outstanding chemical resistance at elevated temperature and good flame resistance. However, there is no one who attempts to produce fiber reinforced furan resin composites by pultrusion process prior to the present invention.

The main object of present invention is to provide a process for pultruding fiber reinforced furan resin composites.

SUMMARY OF THE INVENTION

The present invention is a process for pultruding fiber reinforced furan resin composites comprising the steps of drawing a plurality of continuous filaments through an impregnating bath of liquid furan resin to wet-out the filaments with said resin and a squeeze orifice for removal of excess resin and air, and continuously pulling the resin-impregnated filaments through a pultrusion die to heat and cure said resin, in which the liquid furan resin is maintained at a temperature of 15°–35° C. and has a viscosity ranging from 500–3000 cps during the impregnating step.

Advantageously, the pultrusion die used in the present process is designed to have multiple different heating temperatures along the pultrusion directions, e.g. three heating zones, in which the first heating zone, i.e. near the entrance of the pultrusion die, is kept at a temperature of 150°–180° C., the second heating zone is kept at a temperature of 180°–225° C., and the third heating zone is kept at a temperature of 170°–220° C., and the second heating zone is kept at a temperature higher than those of the first and the third heating zones.

The liquid furan resin used in the present process is a composition containing a furfuryl alcohol prepolymer and an acid catalyst. Suitable acid catalysts can be, for example, p-toluene sulfonic acid, maleic anhydride and phosphoric acid. Among these three catalysts, p-toluene sulfonic acid has the highest catalytic activity. The amount of p-toluene sulfonic acid catalyst used is 0.05–2.5 wt % based on the weight of the prepolymer, preferably 0.5–1.5 wt %. As to the maleic anhydride and phosporic acid catalysts, a higher amount is required to have the same degree of catalytic activity. The fresh liquid furan resin will have a pot life of about 8 hours at the impregnating temperatures and will be sufficiently cured when the resin-impregnated filaments are pulled through the pultrusion die at a pulling rate up to 150 cm/min.

In addition, a postcuring treatment may be optionally employed to the fiber reinforced furan resin composites for improving their physical and mechanical properties, which comprises heating the pultruded composites at a temperature of 100°–220° C. for a period of 1–18 hours.

DETAILED DESCRIPTION OF THE INVENTION

The liquid furan resin used in the present process can be prepared by polymerizing furfuryl alcohol monomers with an addition of an acid catalyst to form a furfuryl alcohol prepolymer and mixing the resulting prepolymer mixture with a suitable amount of acid catalyst. Preferably, the liquid furan resin is prepared just before the commencement of the impregnating step. A typical process for preparing the liquid furan resin comprises polymerizing 100 parts by weight of furfuryl alcohol monomers with an addition of 0.05–2.5, preferably 0.3–1.5, parts by weight of p-toluene sulfonic acid catalyst at a temperature of 35°–70° C. until the reaction mixture has a viscosity of about 300–400 cps, cooling the reaction mixture until the temperature of the reaction mixture reaches the impregnating temperature such that the viscosity thereof is increased to 500–800 cps, and then adding and mixing 0.05–2.5, preferably 0.5–1.5, parts by weight of p-toluene sulfonic acid catalyst into the reaction mixture. The term "viscosity" used in the present invention means the viscosity measured by the method according to ASTM D2393 with a Brookfield type viscometer unless otherwise indicated. In addition to p-toluene sulfonic acid, maleic anhydride and phosphoric acid also can be used as the catalyst. However, the amount of maleic arthydride or phosphoric acid used is relatively higher than that of p-toluene sulfonic acid due to their catalytic activities being slightly lower than that of p-toulene sulfoninc acid.

The liquid furan resin is maintained at a temperature of 15°–35° C. and has a viscosity of 500–3000 cps during the impregnating step, preferably the liquid furan resin is maintained at room temperature 25° C. and has a viscosity of 500–2000 cps, preferably 800–1200 cps. As it is well known to those skilled in the art, in general, the viscosity of a liquid resin will increase during the course of impregnation. In one of the preferred embodiments, the initial viscosity of the liquid furan resin containing 1.5 wt % of p-toluene sulfonic acid based on the weight of furfuryl alcohol prepolymer is 880 cps at 25° C., and it increases to 1400 cps after a period of 2 hours, and about 2000 cps after a period of 4 hours; if the liquid furan resin contains 1.0 wt % of p-toluene sulfonic acid based on the weight of the furfuryl alcohol prepolymer, the viscosity will increase from the initial 620 cps to 750 cps for a period of 4 hours and to 980 cps for a period of 8 hours. This embodiment shows the liquid furan resin contained in the impregnating bath has a long pot life.

The continuous filaments may be employed in various forms such as strand, roving, woven roving, cloth, and mat. Various filamentary materials may be used in producing the composites of the invention such as glass, carbon, aromatic polyamides, ceramic, metal and hybrid thereof.

The pultrusion die which functions to form and cure the fiber reinforced composite is well known in the art, as described in U.S. Pat. No. 3,244,784, the disclosure of which is incorporated herein by reference. Normally, the temperature of the pultrusion die is higher than fiber reinforce composite by about 10° to 20° C. because of the short residence time of the composite in the die. The dimension and profile of the pultruded composites also affect the heating temperature of the pultrusion die. In one of the preferred embodiments of the present invention, the heating temperature profile of a 82-cm long, 1.27-cm wide and 0.219-cm thick curing die is controlled to have three different heating temperatures along the pultrusion direction. Among the three heating temperatures, the second heating temperature is the highest, which ranges from 180°–225° C., preferably 190°–215° C., the first heating temperature, i.e. near the entrance of the pultrusion die, ranges from 150°–180° C., preferably 160°–170° C., and the third heating temperature ranges from 170°–220° C., preferably 180°–215° C. Because the furfuryl alcohol prepolymer/catalyst system used to prepare the liquid furan resin has a high reactivity and the furfuryl alcohol prepolymer has been polymerized to a certain extent in advance, the fiber reinforced composite is able to be produced at a pulling rate of about 150 cm/min under the above-described heating temperature profile and still sufficiently cured. In addition, said first heating temperature can be kept at a temperature higher than 100° C. in order to expel the water contained in the furan resin, and said third heating temperature is also able to be kept at a temperature lower than the second heating temperature to prevent from the water vaporising and expanding inside the pultruded composites at the exit of the pultrusion die.

The pultruded composites may be optionally subjected to a postcuring treatment to improve their physical and mechanical properties. The postcuring treatment is carried out by heating the pultruded composites at a temperature of 100°–220° C. for a period of 2–18 hours. The postcuring temperature is generally in inverse proportion to the postcuring time, i.e. a higher postcuring temperature will require a shorter postcuring period. Preferably, the postcuring treatment is carried out by heating the pultruded composites at 200° C. for 6 hours.

As it is well known in the art, mineral fillers such as talc, silica, and clay, etc. may be added into the liquid furan resin in order to improve the mechanical properties of the pultruded composites. The amount of said mineral fillers added is 1–15 wt % based on the weight of the liquid furan resin.

The apparatus suitable for practicing the present process is disclosed in U.S. Pat. No. 3,244,784, the disclosure of which is incorporated herein by reference.

The invention will be further illustrated by the following examples in which parts and percentages are by weight unless otherwise indicated. The following examples are only meant to illustrate the invention, but not to limit it.

EXAMPLE 1

I) Preparation of the Impregnating Furan Resin

The impregnating furan resin is prepared according to the formula listed in the following Table 1, in which the constituents 2 (5 g) and 3 (10 g) were well mixed and then added into the constituent 1 with stirring, the resulting mixture was kept at 50° C. for polymerizing 3.5 hours, and then the resulting reaction mixture was immediately cooled in an ice bath for about one hour to a temperature of 25° C., in which the viscosity of the reaction mixture prior to the cooling was determined and found 300 cps. 9 g of the constituent 2 and 18 g of the constituent 3 were well mixed and then added into the cooled prepolymer reaction mixture, and the resulting mixture was stirred to form a homogenous impregnating resin which has a temperature of 25° C. and a viscosity of 400–600 cps.

TABLE 1

| Constituent | Weight (gram) |
| --- | --- |
| 1) Furfuryl alcohol monomer | 1000 |
| 2) p-Toluene sulfonic acid, monohydrate | 15.0 |
| 3) Ethanol | 30.0 |

1) Furfuryl alcohol monomer is a commercial product with a solid content of 80%, a specific gravity of 1.15–1.17 (25° C.) and a viscosity of 30–70 cps (25° C.), which is sold under a code of CF-7452 from Chang Chun Plastics Co., Ltd., Taiwan.
2) p-Toluene sulfonic acid monohydrate is a reagent grade compound with a molecular weight of 190.21 and a melting point of 104–107° C., which is available from Japan Pure Chemicals Industrial Co. (Japan).
3) Ethanol used is reagent grade with a purity higher than 99.5 vol % (Taiwan Tobacco and Alcohol Bureau, Taiwan).

II) Pultrusion 16 rovings of 764-NT-218 glass fiber (PPG Co.) were drawn into a bath of the impregnating furan resin prepared above which was maintained at 25° C. They were passed through a squeeze orifice to remove excess resin and air and through a 82-cm long, 1.27-cm wide and 0.219-cm thick curing die. Three sets of individually controlled electrical plate heaters were installed on both top and bottom of the die, where the first and the third set of plate heaters have a length of 15 cm, and the second set of plate heaters has a length of 40 cm.

III) Test Specimens of the Pultruded Composites

The glass fiber content in the final pultruded composite is about 57.5 vol %. The glass fiber reinforced furan resin composites pultruded according to the above-described process by different pulling rates and different curing temperature profiles were tested in accordance with the method of ASTM D790 to obtain their flexural strength and the flexural modulus. The results are shown in Table 2.

TABLE 2

| Die temperature, °C. | | Flexural Strength and Flexural Modulus Pulling rate (cm/min) | | | | |
|---|---|---|---|---|---|---|
| (1st, 2nd, 3rd zone) | | 40 | 70 | 100 | 130 | 150 |
| 165, 215, 210 | a) | 636 | 692 | 481 | 282 | 197 |
| | b) | 52.3 | 52.4 | 49.2 | 44.5 | 40.3 |
| 170, 200, 195 | a) | 554 | 442 | 333 | — | — |
| | b) | 39.6 | 38.1 | 35.1 | — | — |
| 175, 190, 185 | a) | 305 | 258 | 137 | — | — |
| | b) | 39.0 | 36.5 | 25.6 | — | — | a) Flexural strength: MPa
b) Flexural modulus: GPa

IV) Postcuring Treatment

The composites pultruded by a curing temperature profile of 165°–215°–210° C. and a pulling rate of 130 cm/min were further subjected to postcuring treatments at different postcuring temperatures and for different postcuring periods as listed in Table 3. The flexural strength and the tensile strength of the postcured composites are also shown in Table 3. The tensile strength was determined in accordance with the method of ASTM D3039.

TABLE 3

| Postcuring temperature, °C. | | Flexural Strength and Tensile Strength Postcuring time (hours) | | | | |
|---|---|---|---|---|---|---|
| | | 0 | 6 | 12 | 18 | 24 |
| 100 | a) | 662 | 728 | 739 | 756 | 769 |
| | b) | 282 | 904 | 968 | 1045 | 1080 |
| 150 | a) | 662 | 772 | 797 | 807 | 824 |
| | b) | 282 | 1016 | 1071 | 1073 | 1118 |
| 200 | a) | 662 | 898 | 960 | 906 | 837 |
| | b) | 282 | 1198 | 1185 | 1180 | 1165 | a) Flexural strength: MPa
b) Tensile strength: MPa

It can be clearly seen from Table 3 that the preferred postcuring treatment is carried out under 200° C. for 6 hours. Furthermore, the data of Table 3 show that the postcuring pultruded composites will have improved mechanical properties.

EXAMPLE 2

The present example illustrates the preparation of carbon fiber reinforced furan resin composites. The procedures of the above Example 1 were repeated except that 22, 24, 25 and 27 rovings of HTA-12000 carbon fiber (Toho Co., Japan) were used instead of 16 rovings of glass fiber, in which the curing temperature profile of the pultrusion die was 165°–215°–210° C., and the pulling rate was 70 cm/min. The fiber contents of the pultruded composites are listed in Table 4 together with their tensile strength and flexural strength.

TABLE 4

| | Numbers of roving of carbon fiber | | | |
|---|---|---|---|---|
| | 22 | 24 | 25 | 27 |
| Fiber content, vol % | 45.7 | 49.5 | 51.5 | 56.1 |
| Tensile strength, MPa | 869 | 948 | 1070 | 1360 |
| Flexural strength, MPa | 400 | 560 | 671 | 790 |

EXAMPLE 3

The purpose of this example is to show the effect of mineral filler on the mechanical properties of the pultruded composites. 0.0 g, 50 g and 100 g of talc having a specific gravity of 2.71 and an average particle size of 2.12 μm were added in 1000 g the furan resin, respectively in three different runs. The procedures of the above Example 1 were repeated in each run except that said amount of talc was added into the impregnating furan resin, wherein 25 rovings of 764-NT-218 glass fiber were used, the curing temperature profile was 165°–215°–210° C., and the pulling rate was 100 cm/min. The tensile strength and flexural strength of the pultruded composites are shown in Table 5.

TABLE 5

| | Amount of talc used (gram) | | |
|---|---|---|---|
| | 0.0 | 50 | 100 |
| Tensile strength, MPa | 741 | 758 | 588 |
| Flexural strength, MPa | 480 | 525 | 364 |

Data of Table 5 show that the mechanical strength of the pultruded composite will be improved when 50 g of talc is added into the impregnating resin; however, the mechanical strength of the pultruded composite will be adversely affected when 100 g of talc is added into the impregnating resin. It is believed that the poor mechanical strength of the composite using 100 g talc results from the catalytic activity of the acid catalyst used in the resin system being decreased, owing to the acidity of the resin system decreasing after 100 g of talc is added. A higher amount of p-toluene sulfonic acid catalyst or a more severe curing condition should be employed in order to obtained high mechanical strength pultruded composites, when an impregnating furan resin containing a high content of mineral fillers is used in the present process.

I claim:

1. A process for pultruding a fiber reinforced furan resin composite which comprises drawing a plurality of continuous filaments through an impregnating batch of liquid furan resin to saturate the filaments with said resin and a squeeze orifice to remove excess resin and air, and continuously pulling the resin-impregnated filaments through a pultrusion die to heat and cure said resin, wherein the liquid furan resin comprises a furfuryl alcohol prepolymer which is prepared by polymerizing 100 parts by weight of furfuryl alcohol monomer with an addition of 0.05–2.5 parts by weight of an acid catalyst at a temperature of 35°–70° C. until the resulting polymerization mixture has a viscosity of 300–400 cps, and wherein the liquid furan resin is maintained at a temperature of 15°–35° C. and has a viscosity ranging from 500–3000 cps during the impregnating step, and wherein the pultrusion die has three heating zones through which the resin is pultruded, the first zone having a temperature range of 150°–180° C., the second zone having a temperature range of 180°–225° C., and the third zone having a temperature range of 170°–220° C., and wherein the temperature in the second zone is higher than the temperatures in the first and third zones.

2. A process according to claim 1 wherein the resin-impregnated filaments are pulled through the pultrusion die at a pulling rate of up to 150 cm/min.

3. A process according to claim 1 which further comprises a post-curing treatment for the pultruded composite wherein the composite is heated at a temperature of 100°–220° C. for a period of 1–18 hours.

4. A process according to claim 1 wherein said continuous filaments are made of a material selected from the group consisting of glass fibers, carbon fibers, aromatic polyamide fibers, ceramic fibers, metal fibers and hybrid fibers thereof.

5. A process according to claim 1 wherein said liquid furan resin contains 1–15% by weight of a mineral filler based on the weight of the liquid furan resin.

6. A process according to claim 1 wherein the acid catalyst is selected from the group consisting of p-toluene sulfonic acid, maleic anhydride and phosphoric acid.

* * * * *